July 31, 1928.
J. B. LOSEY ET AL
1,678,948
RUBBER COMPOSITION FLOORING
Filed Feb. 21, 1927
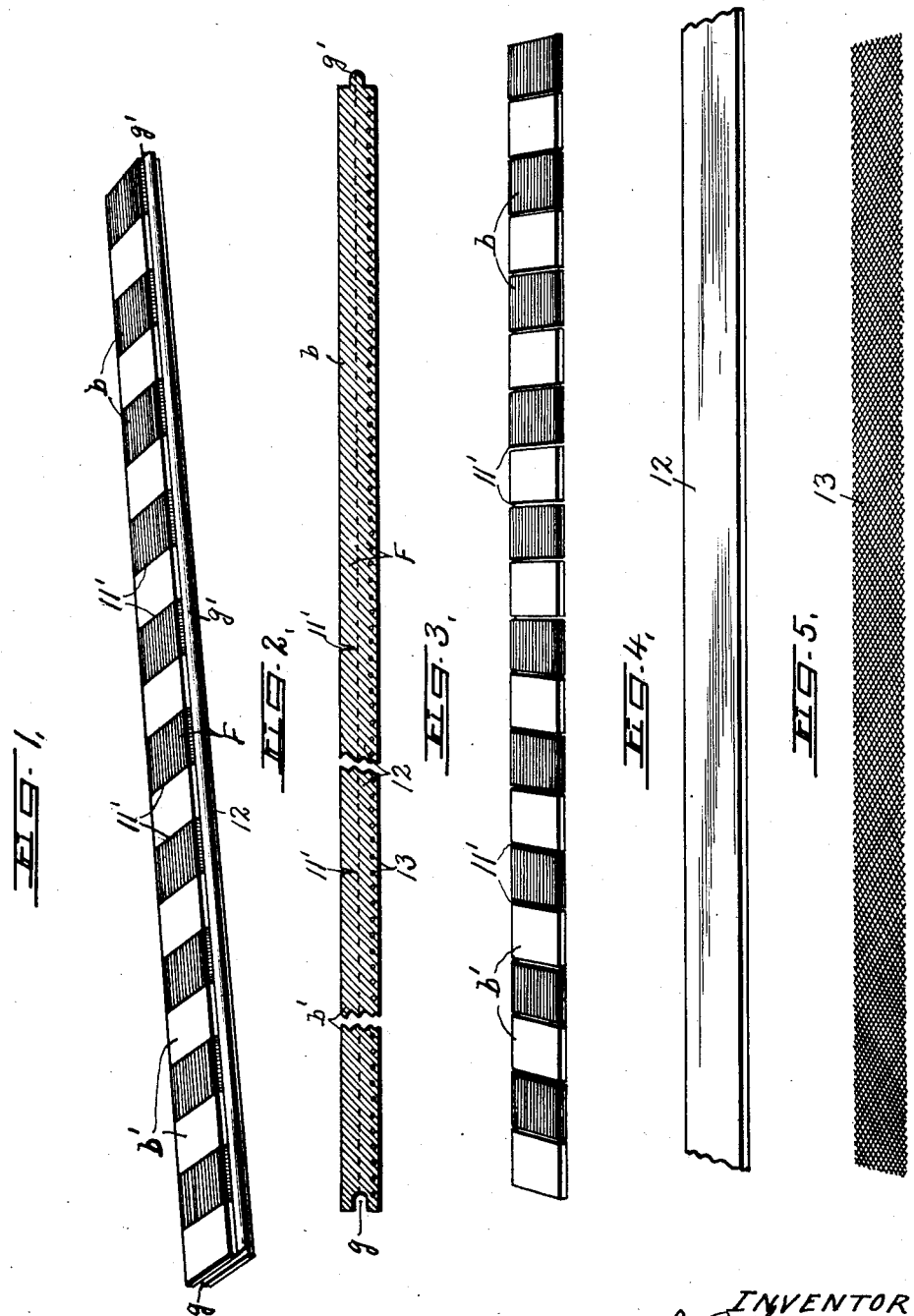

Patented July 31, 1928.

1,678,948

UNITED STATES PATENT OFFICE.

JOHN B. LOSEY AND WALTER R. STONE, OF SYRACUSE, NEW YORK.

RUBBER-COMPOSITION FLOORING.

Application filed February 21, 1927, Serial No. 169,892, and in Great Britain August 19, 1926.

This invention relates to a rubber composition flooring as manufactured under the process set forth in our pending application Serial No. 66,517, filed November 3, 1925.

One of the objects is to make a flooring or side strip of this character by vulcanizing a series of surface plates of rubber composition to a rubber composition base plate in such manner that the adjacent edges of the surface plates will be unattached to each other to permit greater flexibility of the entire unit and thereby to enable it to conform more readily to uneven supporting surfaces without liability of buckling.

Another object is to make the surface plates relatively hard for better resisting wear thereof and also to make the base plate relatively softer than the surface plates so as to form a more or less resilient cushion for said surface plates which in addition to reducing the wear upon the surface plates also serves to deaden the sound of impact of the feet or other objects upon the floor and to further permit the flooring to conform readily to uneven supporting surfaces.

Other objects and uses will be brought out in the following description.

In the drawings:

Figures 1, 2, 3, 4 and 5 are respectively a perspective of a flooring strip embodying our invention, an enlarged longitudinal sectional view, partly broken away, of said flooring strip, a perspective view of a series of detached surface plates adapted to be applied to the base plate, a perspective view, partly broken away, of the base plate and a perspective view of the woven wire reinforcement.

As illustrated, this flooring strip as —F— comprises a base plate —12— and a series of surface plates —b— and —b'— arranged edge to edge lengthwise of and upon the base plate —12— and vulcanized thereto under heat and pressure to form a unitary structure as shown in Figures 1 and 2.

In some instances a woven wire reinforcement —13— may be imbedded in the back or lower face of the base section —12— during the process of vulcanization but is not necessary to the formation of a complete flooring strip for all practical purposes.

The base plate —12— is made of relatively soft rubber composition to form a resilient cushion for the surface plates —b— and —b'— and may be made of any suitable length, width or thickness but is preferably of uniform width and also of uniform thickness from end to end and from side to side.

The surface plates —b— and —b'— are made of relatively hard rubber composition and are arranged edge to edge lengthwise of and upon the base plate —12— and vulcanized thereto so as to become a unitary part thereof, said surface plate being also of uniform width and thickness corresponding approximately to the width and thickness of the base plate —12—.

It will be noted however that the adjacent edges of the plates —b— and —b'— are unattached to each other thus forming a series of longitudinal slits —11'— extending from the outer surface of the plates to the base plate for the purpose of increasing the flexibility of the flooring strip and thereby allowing it to conform more readily to uneven contours of its support and at the same time permitting a limited expansion and contraction of the base plate and surface plates without liability of buckling the flooring strip as a whole.

The surface plates are preferably made in squares of about the width of the base plate and if desired, alternate surface plates may be made in different colors to represent tiling or other mosaics but in either case the adjacent edges of the plates are left unattached to each other from edge to edge of the flooring strip for the purposes described.

During the process of vulcanizing the plates —b— and —b'— to the base plate —12— the molds used for that purpose are provided with means for forming a tongue —g'— and a groove —g— on or in opposite longitudinal edges and opposite end edges of the flooring strip —F— so that the flooring strips when assembled upon a support may be matched one into the other to form a substantially continuous rubber composition mat.

When the reinforcement —13— is desired it will be incorporated under the base plate —12— during the process of vulcanizing the surface plates —b— and —b'— to the base plate at which time the three elements, namely the surface plates, the base plate and reinforcing fabric —13— will be subjected to a vulcanizing heat and pressure, the pressure serving to force the reinforcement —13— into the bottom of the plate —12—.

What we claim is:—

1. A flooring or siding comprising a base section of relatively soft rubber composition and a plurality of surface sections of relatively harder rubber composition vulcanized to one surface of the base section and provided with a tongue and a groove along its opposite edge, both in the plane of the vulcanized surfaces, the meeting edges of the surface sections being in abutting relation but not united.

2. A flooring or siding comprising a relatively soft supporting section of rubber composition and relatively harder surface sections of rubber composition vulcanized to one surface of the supporting section with their adjacent edges abutting but not united to permit the relatively softer supporting section and harder surface sections to readily conform to more or less uneven floor surfaces upon which the softer section is adapted to rest.

In witness whereof we have hereunto set our hands this 26th day of January, 1927.

JOHN B. LOSEY.
WALTER R. STONE.